United States Patent
Gelberger et al.

(10) Patent No.: US 10,638,229 B1
(45) Date of Patent: Apr. 28, 2020

(54) METHODS AND SYSTEMS FOR ESTABLISHING USER CONTROLS

(71) Applicant: Bose Corporation, Framingham, MA (US)

(72) Inventors: Michelle Gelberger, Cambridge, MA (US); Michael Malone, Uxbridge, MA (US); Daniel Winchell Tellier, Pepperell, MA (US); Laurie Jakubiak, Sutton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/370,029

(22) Filed: Mar. 29, 2019

(51) Int. Cl.
    *H04R 5/04*     (2006.01)
    *G06F 9/54*     (2006.01)
    *H04R 5/033*     (2006.01)

(52) U.S. Cl.
    CPC .............. *H04R 5/04* (2013.01); *G06F 9/542* (2013.01); *H04R 5/033* (2013.01); *H04R 2420/07* (2013.01)

(58) Field of Classification Search
    CPC ...... H04R 5/04; H04R 5/033; H04R 2420/07; G06F 9/542
    See application file for complete search history.

(56) References Cited

U.S. PATENT DOCUMENTS

| | | | |
|---|---|---|---|
| 7,280,097 B2 * | 10/2007 | Chen | G06F 3/0219 345/156 |
| 8,238,567 B2 | 8/2012 | Burge et al. | |
| 8,238,570 B2 | 8/2012 | Johnson, Jr. et al. | |
| 8,243,946 B2 | 8/2012 | Burge et al. | |
| 8,699,719 B2 | 4/2014 | Johnson, Jr. et al. | |
| 9,743,170 B2 | 8/2017 | Yamkovoy | |
| 9,838,812 B1 | 12/2017 | Shetye et al. | |
| 9,860,626 B2 | 1/2018 | Ergezer et al. | |
| 9,924,255 B2 | 3/2018 | Patel et al. | |
| 10,045,111 B1 | 8/2018 | Bonner et al. | |
| 10,080,092 B2 | 9/2018 | Shetye et al. | |
| 10,257,602 B2 | 4/2019 | Kofman | |
| 2014/0304430 A1 * | 10/2014 | Salley | G06F 13/102 710/10 |
| 2014/0314247 A1 * | 10/2014 | Zhang | H04R 1/1041 381/74 |
| 2018/0167715 A1 * | 6/2018 | Graylin | G10K 11/17827 |
| 2019/0052951 A1 | 2/2019 | Kofman et al. | |

* cited by examiner

*Primary Examiner* — Andrew L Sniezek
(74) *Attorney, Agent, or Firm* — Bond, Schoeneck & King, PLLC

(57) ABSTRACT

Audio systems and methods for establishing user controls including providing a first wearable audio device having a speaker, a first communication module, and a first user interface adapted to receive a first plurality of user inputs, associating the first plurality of user inputs with a default control setting state of the first wearable audio device, establishing, via circuitry of a first peripheral device, a first connection between the first wearable audio device and the first peripheral device, receiving, via the first communication module, a first indication that the first peripheral device is running a first application, and automatically associating one or more user inputs of the first plurality of user inputs with a first control setting state when the first wearable audio device receives the first indication from the first peripheral device.

22 Claims, 6 Drawing Sheets

METHODS AND SYSTEMS FOR ESTABLISHING USER CONTROLS

BACKGROUND

This disclosure relates to audio systems and methods for establishing user controls for applications.

SUMMARY OF THE DISCLOSURE

The present disclosure describes various systems and methods for partially and/or fully altering control settings for augmented reality applications using wearable audio devices. More specifically, this disclosure relates to altering control settings from a default control setting state, to a first control setting state and/or a second control setting state.

In an aspect, a method for establishing user controls is provided, the method including: providing a first wearable audio device having a speaker, a first communication module, and a first user interface adapted to receive a first plurality of user inputs; associating the first plurality of user inputs with a default control setting state of the first wearable audio device; establishing, via circuitry of a first peripheral device, a first connection between the first wearable audio device and the first peripheral device; receiving, via the first communication module, a first indication that the first peripheral device is running a first application; and, automatically associating one or more user inputs of the first plurality of user inputs with a first control setting state when the first wearable audio device receives the first indication from the first peripheral device.

In an aspect, all of the user inputs of the first plurality of user inputs are automatically associated with the first control setting state when the first wearable audio device receives the first indication from the first peripheral device.

In an aspect, the circuitry of the first peripheral device comprises a first processor, a first memory, and second communication module.

In an aspect, the second communication module comprises a first antenna arranged to wirelessly send and/or receive data exchanged in the first connection.

In an aspect, the method further includes: receiving a notification associated with an exit condition from the first peripheral device; and, automatically reverting the association of the one or more user inputs of the plurality of user inputs to an association with the default control setting state upon receiving the notification.

In an aspect, the notification is selected from an operating system notification and/or a notification from a third-party application.

In an aspect, a method for establishing user controls is provided, the method including: providing a first wearable audio device having a speaker, a first communication module, and a first user interface adapted to receive a first plurality of user inputs; associating the first plurality of user inputs with a default control setting state of the first wearable audio device; establishing, via circuitry of a first peripheral device, a first connection between the first wearable audio device and the first peripheral device; receiving, via the first communication module, a first indication that the first peripheral device is running a first application; automatically associating one or more user inputs of the first plurality of user inputs with a first control setting state when the first wearable audio device receives the first indication from the first peripheral device; receiving, via the first communication module, a second indication that the first peripheral device is running a second application; and, automatically associating one or more user inputs of the first plurality of user inputs with a second control setting state when the first wearable audio device receives the second indication from the first peripheral device.

In an aspect, all of the user inputs of the first plurality of user inputs are automatically associated with the first control setting state when the first wearable audio device receives the first indication from the first peripheral device.

In an aspect, all of the user inputs of the first plurality of user inputs are automatically associated with the second control setting state when the first wearable audio device receives the second indication from the first peripheral device.

In an aspect, the circuitry of the first peripheral device comprises a first processor, a first memory, and second communication module.

In an aspect, the second communication module comprises a first antenna arranged to wirelessly send and/or receive data exchanged in the first connection.

In an aspect, the method further includes: receiving a notification associated with an exit condition from the first peripheral device; and, automatically reverting the association of the one or more user inputs of the first plurality of user inputs to an association with the default control setting state upon receiving the notification.

In an aspect, the notification is selected from an operating system notification and/or a notification from a third-party application.

In an aspect, an audio system is provided, the audio system including a first wearable audio device. The first wearable device including a speaker, a first communication module arranged to establish a first connection with a first peripheral device and receive a first indication that a first peripheral device is running a first application, and a first user interface adapted to receiving a first plurality of user inputs. The first peripheral device or the first wearable audio device are arranged to: (i) associate one or more user inputs of the first plurality of user inputs with a default control setting state of the first wearable audio device; and (ii) automatically associate one or more user inputs of the first plurality of user inputs with a first control setting state when the first wearable audio device receives the first indication from the first peripheral device.

In an aspect, all of the user inputs of the first plurality of user inputs are automatically associated with the first control setting state when the first wearable audio device receives the first indication from the first peripheral device.

In an aspect, the first communication module is arranged to receive a second indication that the first peripheral device is running a second application In an aspect, the first peripheral device or the first wearable audio device are further arranged to: (iii) automatically associate one or more user inputs of the first plurality of user inputs with a second control setting state when the first wearable audio device receives the second indication from the first peripheral device.

In an aspect, all of the user inputs of the first plurality of user inputs are automatically associated with the second control setting state when the first wearable audio device receives the second indication from the first peripheral device.

In an aspect, the circuitry of the first peripheral device comprises a first processor, a first memory, and second communication module.

In an aspect, the second communication module comprises a first antenna arranged to wirelessly send and/or receive data exchanged in the first connection.

In an aspect, the first peripheral device or the first wearable audio device are further arranged to: (iv) receive a notification associated with an exit condition from the first peripheral device; and, (v) automatically revert the association of the one or more user inputs of the first plurality of user inputs to an association with the default control setting state upon receiving the notification.

In an aspect, the notification is selected from an operating system notification and/or a notification from a third-party application.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure describes various systems and methods for partially and/or fully altering control settings for augmented reality applications using wearable audio devices. More specifically, this disclosure relates to altering control settings from a default control setting state, to a first control setting state and/or a second control setting state.

Figure 1:
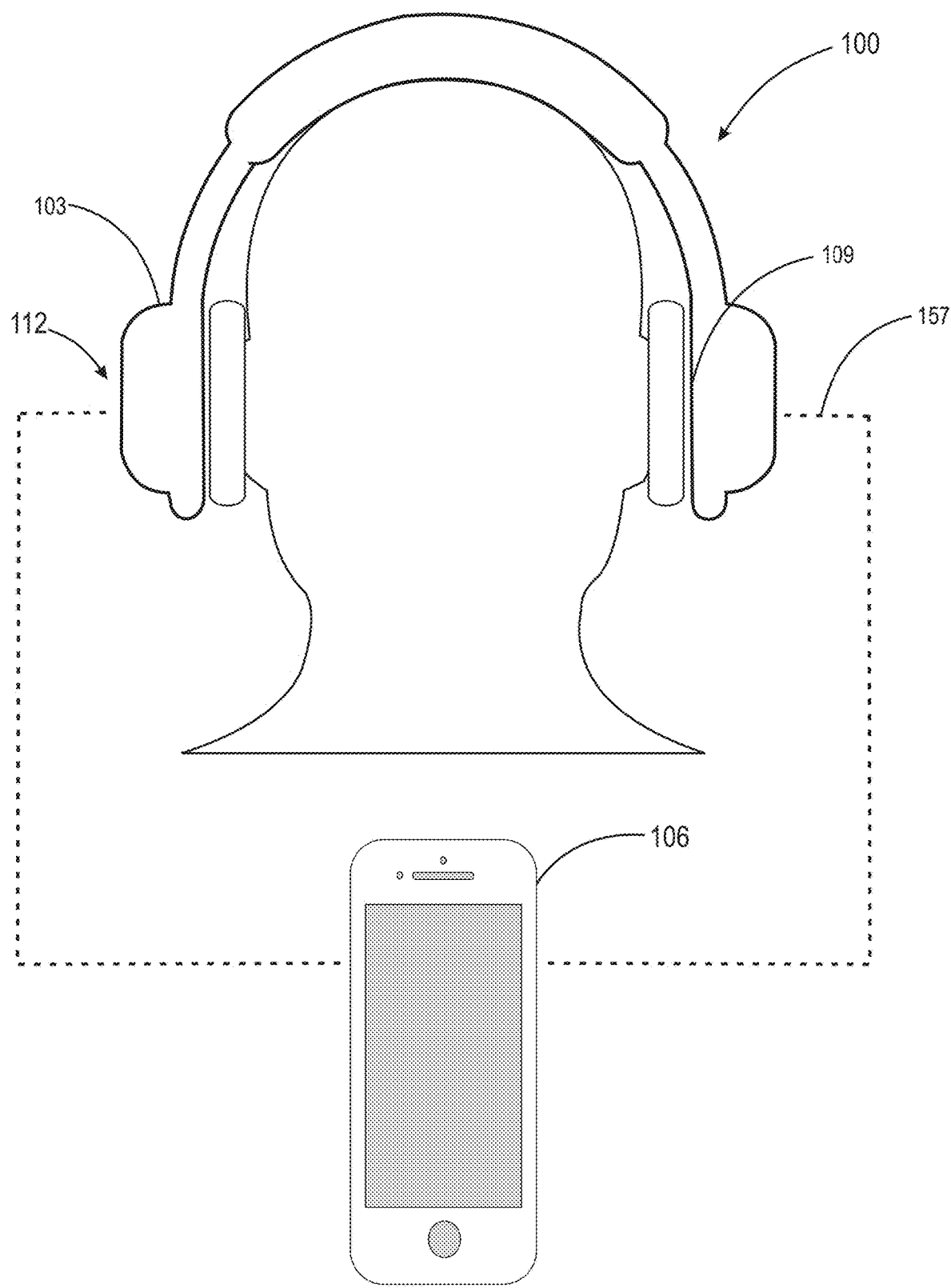
FIG. 1 is a schematic view of an audio system according to the present disclosure.

The term "wearable audio device", as used in this application, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver may be housed in an earcup. While some of the figures and descriptions following may show a single wearable audio device, having a pair of earcups (each including an acoustic driver) it should be appreciated that a wearable audio device may be a single stand-alone unit having only one earcup. Each earcup of the wearable audio device may be connected mechanically to another earcup or headphone, for example by a headband and/or by leads that conduct audio signals to an acoustic driver in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset. While FIG. 1 shows an example of an around-ear headset, in other examples the headset may be an in-ear, on-ear, or near-ear headset. In some examples, a wearable audio device may be an open-ear device that includes an acoustic driver to radiate acoustic energy towards the ear canal while leaving the ear open to its environment and surroundings.

Figures 2A, 2B:
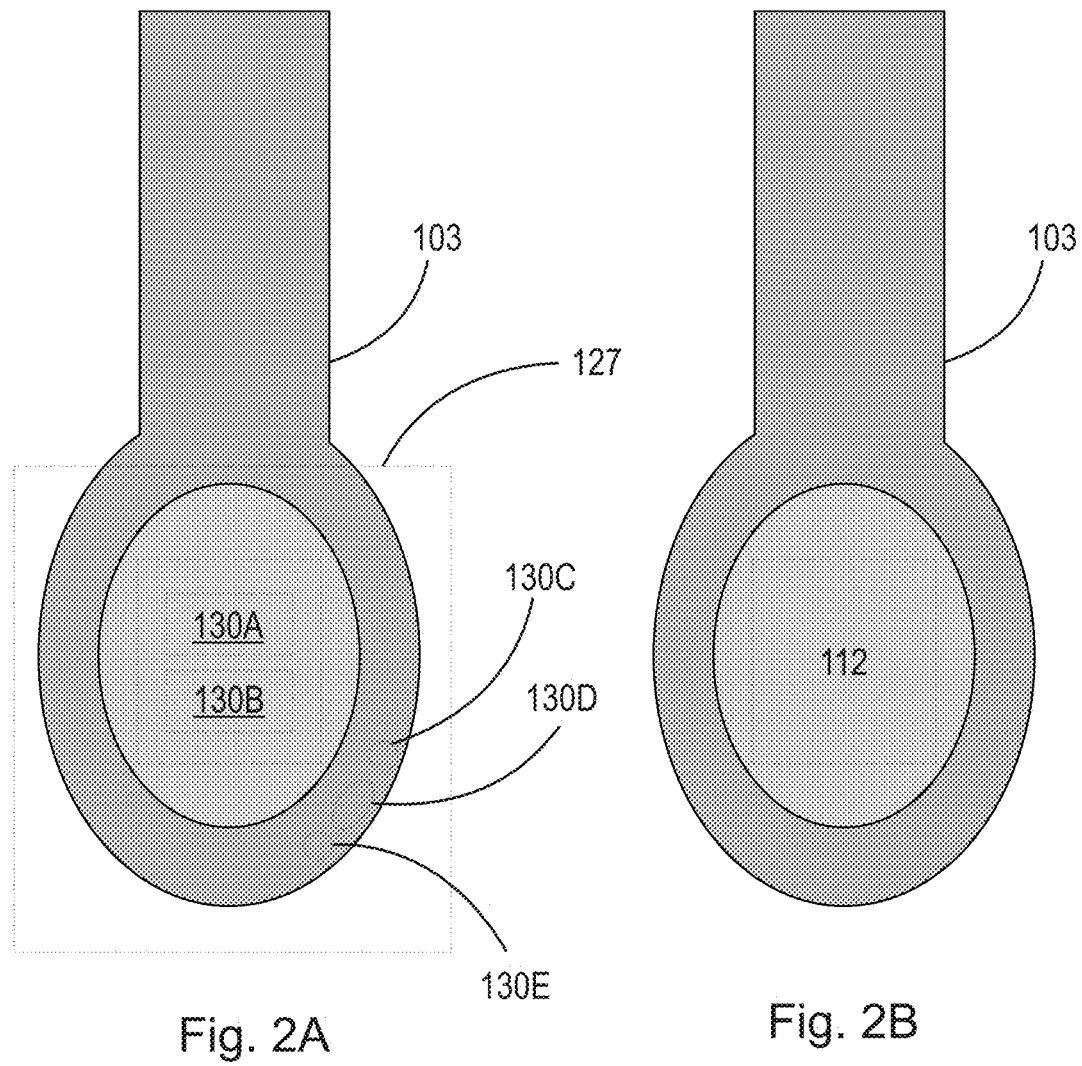
FIG. 2A is a right-side schematic view of a first wearable audio device according to the present disclosure.
FIG. 2B is a left-side schematic view of a first wearable audio device according to the present disclosure.

The following description should be read in view of FIGS. 1-2B. FIG. 1 is a schematic view of audio system 100 according to the present disclosure. Audio system 100 includes a first wearable audio device 103 and a peripheral device 106 discussed below. Although illustrated in FIG. 1 as a pair over-ear headphones, it should be appreciated that first wireless audio device 103 could be any type of headphone or wearable device capable of establishing a wireless or wired data connection with peripheral device 106.

Figure 4A:
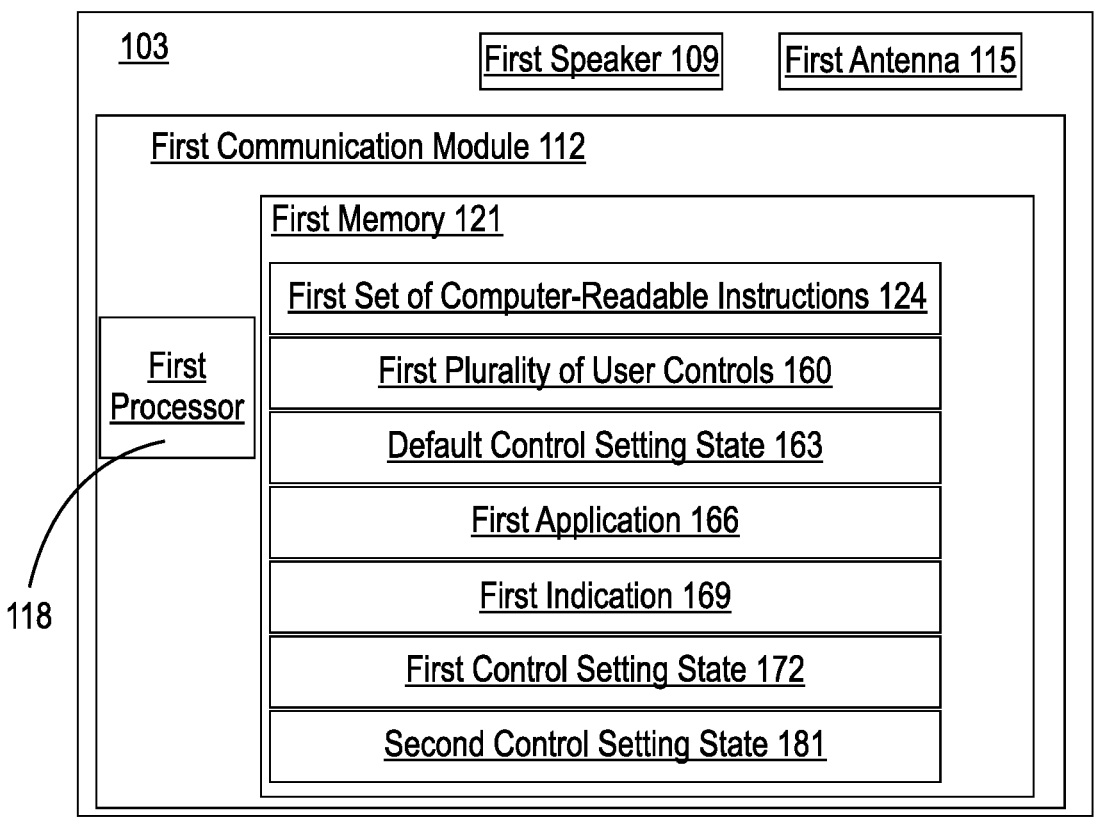
FIG. 4A is a schematic view of the electronic components of a first wearable audio device according to the present disclosure.

First wearable audio device 103 includes first speaker 109 and first communication module 112 (shown in FIGS. 2B and 4A). First speaker 109 is arranged to produce a first audio signal proximate at least one ear of a user in response to audio data sent and/or received from first communication module 112. First communication module 112 is arranged to send and/or receive data from an antenna, e.g., first antenna 115 as shown in FIG. 4A. The data received can be, e.g., audio data or communication data (e.g., data related to first indication 169 (not shown), second indication 178 (not shown), first notification 184 (not shown), and first connection 157 (shown in FIG. 1) discussed below) sent and/or received from a plurality of external devices, e.g., peripheral device 106. It should be appreciated, that first communication module 112 can be operatively connected to processor 118 (shown in FIG. 4A) and first memory 121 (shown in FIG. 4A) operatively arranged to execute and store a first set of non-transitory computer-readable instructions 124 (shown in FIG. 4A), as well as a battery or other power source (not shown).

As shown in FIG. 2A, first wearable audio device 103 further includes a first user interface 127 having a plurality of user inputs 130. It should be appreciated that, although illustrated in FIG. 2A as a plurality of touch capacitive sensors 130A-130B or a series of buttons or slideable switches 130C-130E, first user interface 127 and first plurality of user inputs 130 can take any form capable of receiving an input from a user. Additionally, although not discussed in detail, at least one user input of first plurality of user inputs 130 can be a signal generated by inertial sensors located on or within first wearable audio device 103, e.g., an accelerometer, a gyroscope, and/or a magnetometer, such that a motion or a gesture made by the user can serve as an input of first plurality of inputs 130. FIGS. 2A-2B illustrate a right-side schematic view and a left-side schematic view, respectively, of first wearable audio device 103 having user first interface 127 and first plurality of user inputs 130, e.g., user inputs 130A-130E. It should be appreciated that first interface 127 and first plurality of user inputs 130A-130E can be arranged on the right side or left side of first wearable audio device 103 in any order, pattern, or placement, and any conceivable combination thereof.

Figure 3:
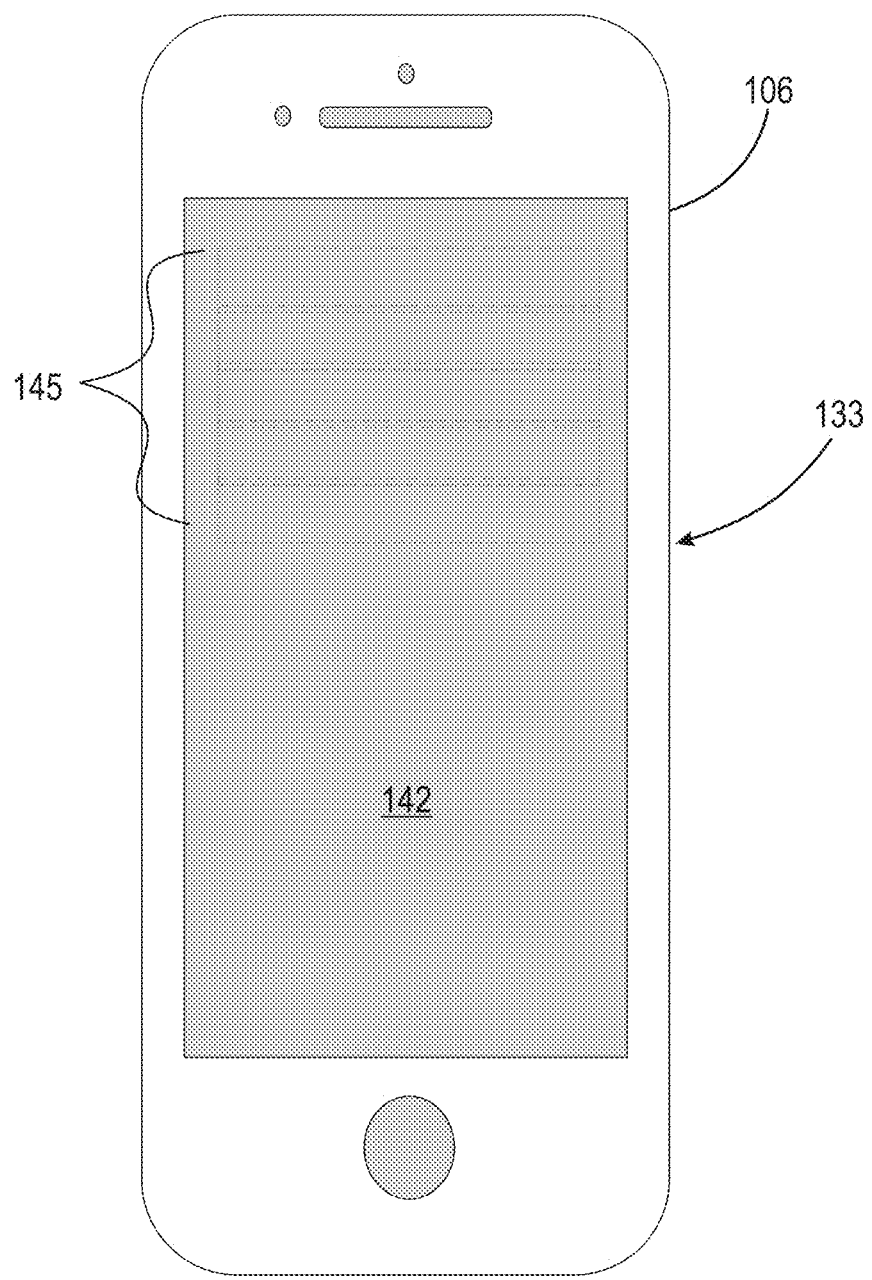
FIG. 3 is a schematic view of a first peripheral device according to the present disclosure.

FIG. 3 illustrates a front schematic view of first peripheral device 106 according to the present disclosure. First peripheral device 106 includes circuitry 133 which can include second communication module 136 (shown in FIG. 4B) arranged to send and/or received data, e.g., audio data or communication data (e.g., data related to first indication 169

Figure 4B:
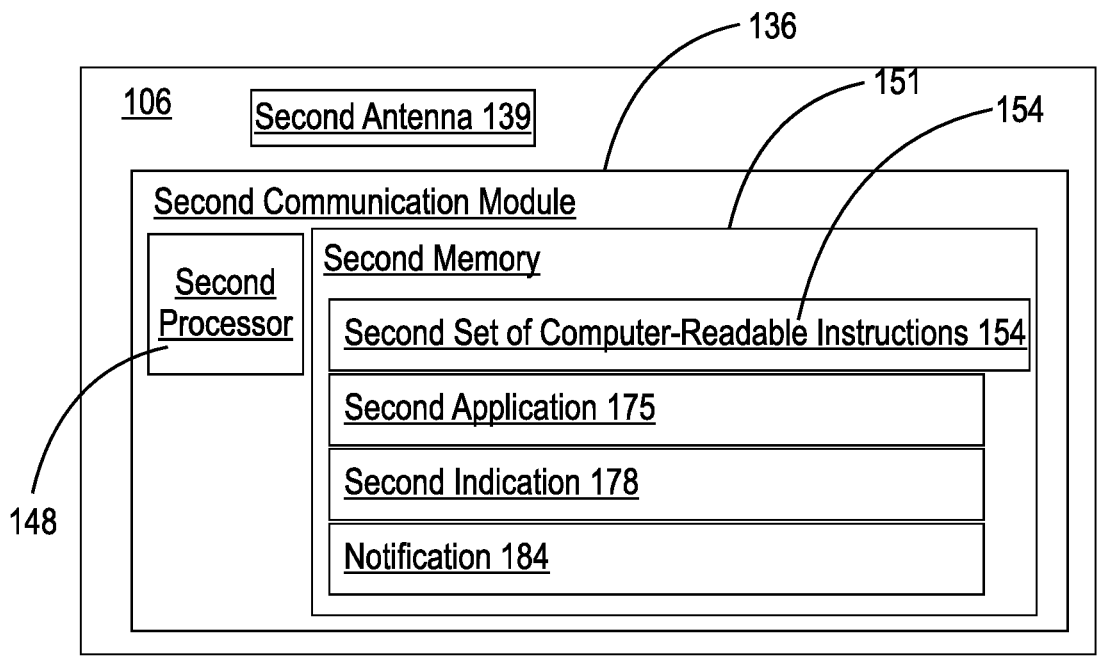
FIG. 4B is a schematic view of the circuitry of a first peripheral device according to the present disclosure.

(not shown), second indication 178 (not shown), first notification 184 (not shown), and first connection 157 (shown in FIG. 1) discussed below) via a second antenna 139 (shown in FIG. 4B). First peripheral device 106 further includes second user interface 142 having a second plurality of user inputs 145, and second processor 148 (shown in FIG. 4B) and second memory 151 (shown in FIG. 4B) arranged to execute and store a second set of non-transitory computer-readable instructions 154 (shown in FIG. 4B). It should be appreciated that although illustrated in FIG. 3 as a touch screen of a smart phone or device, second user interface 142 and second plurality of user inputs 145 can take any form capable of receiving an input from a user. Furthermore, although not discussed in detail, at least one user input of second plurality of user inputs 145 can be a signal generated by inertial sensors located on or within first peripheral device 106, e.g., an accelerometer, a gyroscope, and/or a magnetometer, such that a motion or a gesture made by the user can serve as an input of second plurality of inputs 145. Although not illustrated, it should be appreciated that notification 184 can be selected from The following description should be read in view of FIGS. 1-4B. During operation of audio system 100, first wearable audio device 103 or first peripheral device 106 are arranged to establish a first connection, i.e., first connection 157. For example, first antenna 115 of first communication module 112 may initiate/request a first connection 157 with first peripheral device 106 where the request is received and accepted via second antenna 139 of second communication module 136. Conversely, second antenna 139 of second communication module 136 may initiate/request first connection 157 with first wearable audio device 103 where the request is received an accepted via first antenna 115 of first communication module 112. In one example, first connection 157 is a wireless connection established between first communication module 112 and second communication module 136 using a wireless protocol. It should be appreciated that the wireless protocol can be selected from: a Bluetooth protocol, a Bluetooth Low-Energy (BLE) protocol, a ZigBee protocol, a Wi-Fi (IEEE 802.11) protocol, Near Field Magnetic Induction (NFMI), Near-Field Electromagnetic Induction (NFEMI), or any other protocol for establishing a wireless connection between first wearable device 103 and first peripheral device 106. It should further be appreciated that first connection 157 may be a physical connection made between first wearable audio device 103 and first peripheral device 106, e.g., via a cable or cord arranged to send and/or receive audio data and communication data between first wearable audio device 103 and first peripheral device 106.

After establishing first connection 157 between first audio device 103 and first peripheral device 106, the first plurality of user inputs 130 are associated with a first plurality of user controls 160. First plurality of user controls 160 can include controls associated with, for example: accepting an incoming call, declining an incoming call, accepting an incoming notification, declining an incoming notification, activating or deactivating active noise reduction of first wearable audio device 103, setting a level of active noise reduction, increasing the volume of the audio signal produced by at least first speaker 109, decreasing the volume of the audio signal produced by at least first speaker 109, muting the audio signal produced by at least first speaker 109, or a customizable action control established by the user. When no applications are running on first peripheral device 106, first plurality of user controls 160 are associated with a default control setting state 163. The default control setting state 163 may map or associate some or all of the foregoing controls to, e.g., some or all of first plurality of user inputs 130A-130E. In one example, default control setting state 163 may map user control input 130A of first plurality of user control inputs 130 to a control of first plurality of user controls 160 corresponding with accepting an incoming call. Similarly, control input 130B may be mapped to a user control corresponding with declining an incoming call; control input 130D may be mapped to a user control corresponding with activating or deactivating active noise reduction of first wearable audio device 103; and control inputs 130C and control input 130E may not be mapped to any controls. It should be appreciated that the association of first plurality of user controls 160 with any of first plurality of user inputs 130A-130E may be achieved by overwriting the firmware instructions stored in first memory 121 of first wearable audio device 103, or remapping the firmware instructions of first wearable audio device 103 via a third-party application, e.g., first application 166 and/or second application 175 discussed below.

Through use of first wearable audio device 103 and/or first peripheral device 106, the user may initiate, or cause to initiate, a first application 166 to run on first peripheral device 106. It should be appreciated that at least a portion of the operational instructions for first application 166 may be executed and stored by second processor 148 and second memory 151, respectively. Upon initiating, or causing to initiate, first application 166 to run on first peripheral device 106, a first indication 169 is generated by either first application 166 or first peripheral device 106 to automatically associate the first plurality of user inputs 130 of first wearable audio device 103 with a first control setting state 172.

In one example, first application 166 is a third-party program or application directed to: listening to audio files of a digital audio library or audio files related to an augmented reality experience, where the audio files are: streamed to first peripheral device 106 via any of the wired or wireless protocols discussed above; stored in second memory 151 of first peripheral device 106; stored in a memory of an additional peripheral device (e.g., a memory accessible via a network connection, such as a cloud-based connection); or any combination thereof. In this example, first control setting state 172 may map user control input 130A of first plurality of user control inputs 130 to a control of first plurality of user controls 160 corresponding with accepting an incoming call. Similarly, control input 130B may be mapped to a user control corresponding with declining an incoming call; control input 130C may be mapped to a user control corresponding with increasing the volume of the audio signal produced by at least first speaker 109; control input 130D may be mapped to a user control corresponding with activating or deactivating active noise reduction of first wearable audio device 103; and control input 130E may be mapped to may be mapped to a user control corresponding with decreasing the volume of the audio signal produced by at least first speaker 109. It should be appreciated that in first control setting state 172 at least some of the controls previously mapped to the respective control inputs of first plurality of user control settings 130A-130E remain unchanged from the default control setting state 163, e.g., user control input 130A being mapped to a control corresponding with accepting an incoming call, while at least one new control was added, e.g., control input 130C being mapped to a user control corresponding with increasing the volume of the audio signal produced by at least first speaker 109. As at least one control remains unchanged while at least one control has been added, i.e., is new in first control setting state 172, the foregoing change from default control settings state 163 to first control setting state 172 is a partial takeover of the user controls of audio system 100.

Alternatively, in one example, first application 166 is a third-party program or application directed to listening to audio files of a digital audio library or audio files related to an augmented reality experience, where the audio files are: streamed to first peripheral device 106 via any of the wired or wireless protocols discussed above; stored in second memory 151 of first peripheral device 106; stored in a memory of an additional peripheral device (e.g., a memory accessible via a network connection, such as a cloud-based connection); or any combination thereof. In this alternative example, first control setting state 172 may map user control input 130C to a user control corresponding with increasing the volume of the audio signal produced by at least first speaker 109 and map control input 130E to a user control corresponding with decreasing the volume of the audio signal produced by at least first speaker 109. Additionally, control inputs 130A, 130B, and 130D may not be mapped to a corresponding user control of first plurality of user controls 160. It should be appreciated that in this example of first control setting state 172, all of the controls previously mapped to the respective control inputs of first plurality of user control settings 130A-130E are now mapped to new and/or different user inputs, i.e., no user input is mapped to a control it was previously mapped to in the default control setting state 163. As all controls are new with respect to default control setting state 163, this change from default control setting state 163 to first control setting state 172 is a full takeover of the user controls of audio system 100. It should be appreciated that user inputs 130A, 130B, and 130D can, in the alternative to no control mapping as described above, be mapped to new/different controls. For example, 130A could now be mapped to a control corresponding with declining an incoming call, input 130B could now be mapped to a control corresponding with activating active noise reduction, and input 130D could now be mapped to a control corresponding with accepting an incoming call.

It should be appreciated that first indication 169, in the alternative to being automatically generated upon initiating first application 166, can also be generated manually, e.g., via at least one user input of first plurality of user inputs 130, via at least one input of second plurality of user inputs 145, or via a signal generated by inertial sensors located on or within first wearable audio device 103 or first peripheral device 106, e.g., an accelerometer, a gyroscope, and/or a magnetometer.

In addition to audio system 100 switching from default control setting state 163 to first control setting state 172 automatically when first wearable audio device 103 receives first indication 169 that first peripheral device 106 is running first application 166, it should be appreciated that audio system 100 can also automatically revert from first control setting state 172 to default control setting state 163 upon receiving a pre-determined exit condition. For example, a user may configure via a second user interface 142 that upon receiving a notification, e.g., notification 184, which can be for example, an operating system notification, receiving an incoming call; receiving an incoming text message; or receiving a notification or alert that battery power for either first wearable audio device 103 or first peripheral device 106 is low, critically low, charging, or fully charged; audio system 100 should revert from first control setting state 172 to default control settings state 163. In another example, a user may configure via second user interface 142 that upon, receiving a notification from a third-party application, e.g., receiving a notification or alert that first wearable audio device 103 or first peripheral device 106 is in a predetermined location or the first peripheral device 106 receives a request for initiation of a video conference, audio system 100 should revert from first control setting state 172 to default control settings state 163. In addition, upon a user exiting first application 166 (e.g., by closing first application 166, placing first application in the background 166, or concluding an experience within first application 166), audio system 100 may automatically revert from first control setting state 172 to default control setting state 163.

In a further example, the user may initiate, or cause to initiate, a second application 175 to run on first peripheral device 106 in addition to first application 166. It should be appreciated that at least a portion of the operational instructions for second application 175 may be executed and stored by second processor 148 and second memory 151, respectively. Upon initiating, or causing to initiate, second application 175 to run on first peripheral device 106, a second indication 178 is generated by either second application 175 or first peripheral device 106 to automatically associate the first plurality of user inputs 130 of first wearable audio device 103 with a second control setting state 181.

In this further example, first application 166 is a third-party program or application directed to listening to audio files from a digital audio library and second application 175 is a third-party program or application directed to listening to audio files related to an augmented reality experience. As discussed above, the audio files for both applications can be: streamed to first peripheral device 106 via any of the wired or wireless protocols discussed above; stored in second memory 151 of first peripheral device 106; stored in a memory of an additional peripheral device (e.g., a memory accessible via a network connection, such as a cloud-based connection); or any combination thereof. In response to the second indication, audio system 100 may automatically associate one or more user inputs from the first plurality of user inputs 130 with one or more user control settings of a plurality of user control settings 160. Additionally, in the switch from first control setting state 172 to second control setting state 181, audio system 100 may associate one or more user inputs with one or more user controls consistent with the mapping of those respective controls from the first control setting state 175 while associating one or more user inputs a new user control with respect to first control setting state 172 (partial takeover). Alternatively, audio system 100 may associate the user inputs with only new user controls with respect to first control setting state 172 (full takeover).

It should be appreciated that second indication 178, in the alternative to being automatically generated upon initiating second application 175, can also be generated manually, e.g., via at least one user input of first plurality of user inputs 130, via at least one input of second plurality of user inputs 145, or via a signal generated by inertial sensors located on or within first wearable audio device 103 or first peripheral device 106, e.g., an accelerometer, a gyroscope, and/or a magnetometer.

In addition to audio system 100 switching from first control setting state 172 to second control setting state 181 automatically when first wearable audio device 103 receives second indication 178 that first peripheral device 106 is running second application 175, it should be appreciated that audio system 100 can also automatically revert from second control setting state 181 to default control setting state 163 or first control setting state 172 upon execution of a predetermined exit condition. For example, a user may configure via a second user interface 142 that upon receiving an operating system notification, i.e., notification 184, which can be, for example, receiving an incoming call; receiving an incoming text message; or receiving a notification or alert that battery power for either first wearable audio device 103 or first peripheral device 106 is low, critically low, charging, or fully charged; audio system 100 should revert from second control setting state 181 to either default control settings state 163 or first control setting state 172. In another example, a user may configure via second user interface 142 that upon, receiving a notification from a third-party application, e.g., receiving a notification or alert that first wearable audio device 103 or first peripheral device 106 is in a predetermined location or the first peripheral device 106 receives a request for initiation of a video conference, audio system 100 should revert from second control setting state 181 to either default control settings state 163 or first control setting state 172. In addition, upon a user exiting second application 175 (e.g., by closing first application 166, placing first application in the background, or concluding an experience within first application 166), audio system 100 may automatically revert from second control setting state 181 to default control setting state 163 or first control setting state 172.

FIG. 4A is a schematic view of the electronic components included in first wearable audio device 103. For example, as discussed above, first wearable audio device 103 can include first speaker 109, first communication module 112, first antenna 115, first processor 118, first memory 121, and first set of non-transitory computer-readable instructions 124. Similarly, FIG. 4B illustrates circuitry 133 of first peripheral 106 device according to the present disclosure. For example, as discussed above, first peripheral device 106 can include second communication module 136, second antenna 139, second processor 148, second memory 151, and second set of non-transitory computer-readable instructions 154.

Figure 5A:
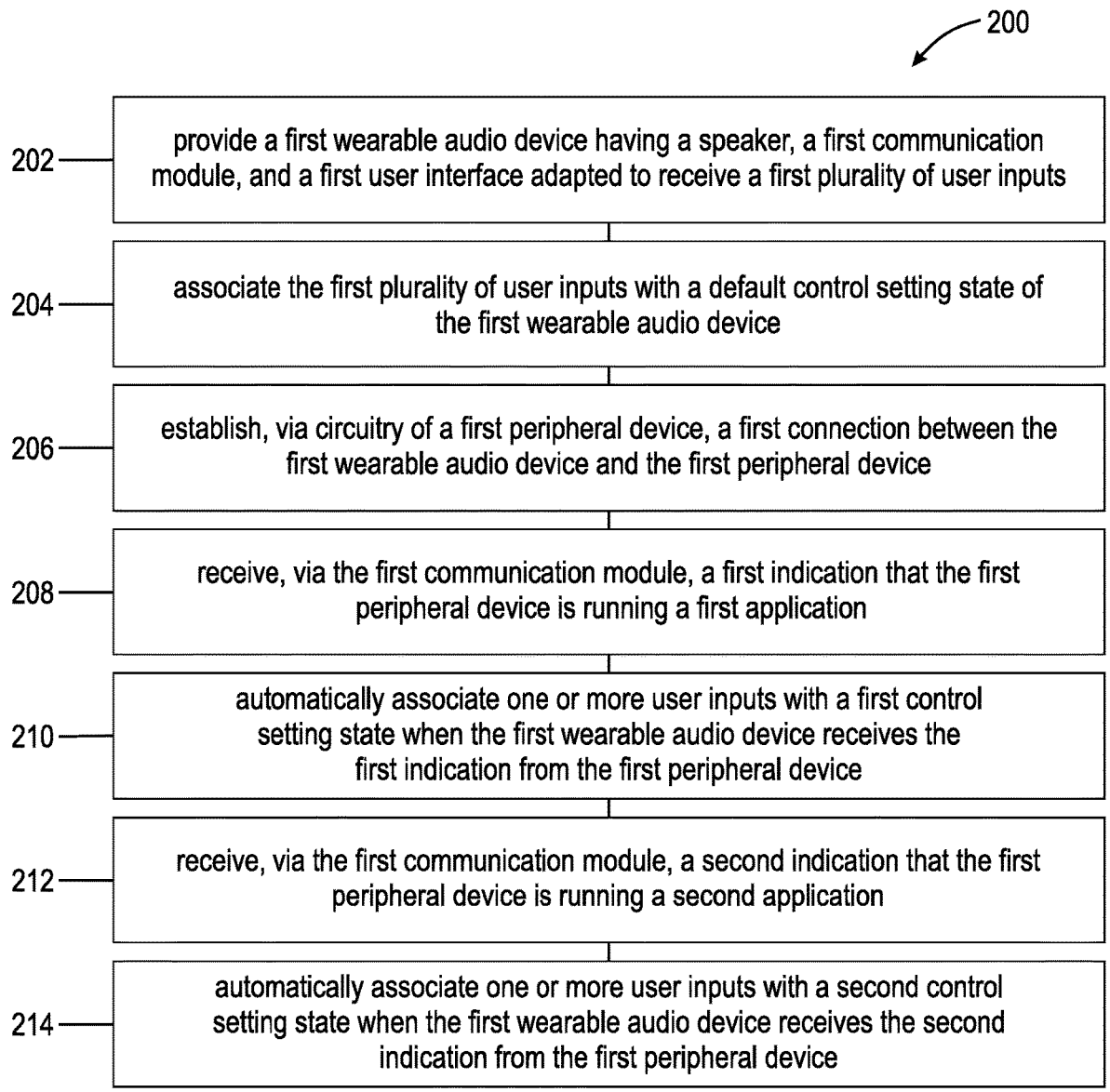
FIG. 5A is a flow chart illustrating the steps of the method according to the present disclosure.
Figure 5B:
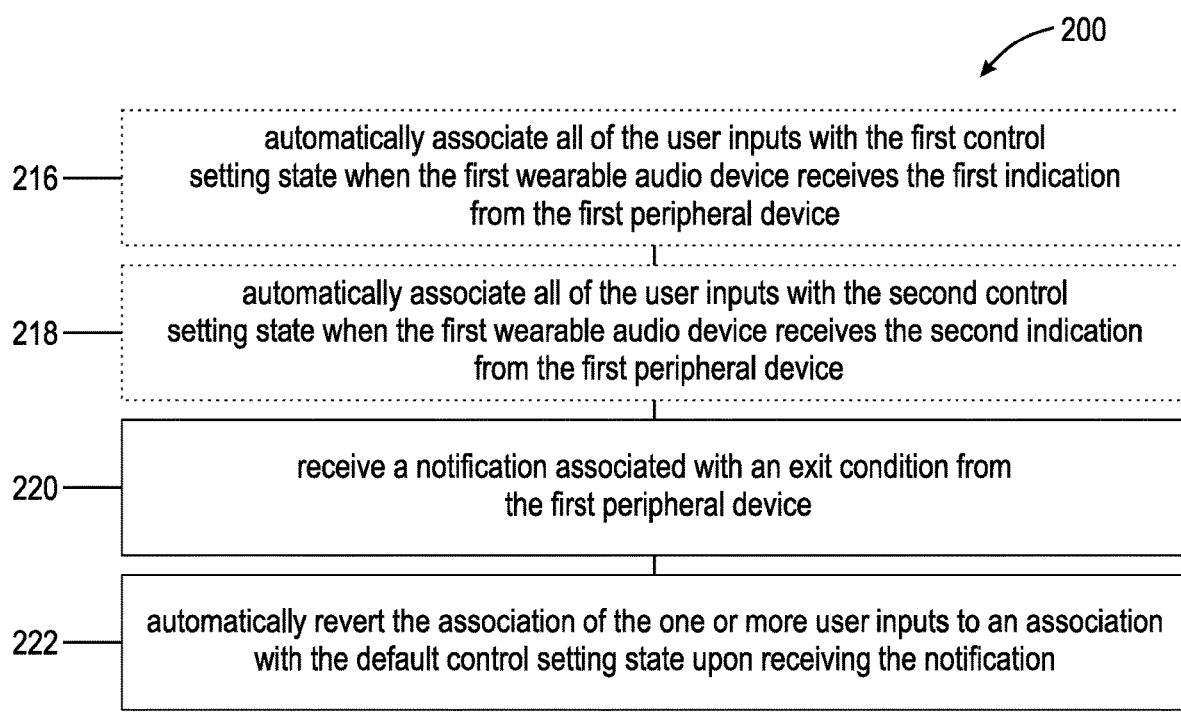
FIG. 5B is a flow chart illustrating the steps of the method according to the present disclosure.

FIGS. 5A-5B illustrate a flow chart illustrating the steps of method 200 according to the present disclosure. Method 200 includes, for example, providing a first wearable audio device 103 having a speaker 109, a first communication module 112, and a first user interface 127 adapted to receive a first plurality of user inputs 130A-130E (step 202); associating the first plurality of user inputs 130A-130E with a default control setting state 163 of the first wearable audio device 103 (204); establishing, via circuitry 133 of a first peripheral device, a first connection 157 between the first wearable audio device 103 and the first peripheral device 106 (step 206); receiving, via the first communication module 112, a first indication 169 (not shown) that the first peripheral device 106 is running a first application 166 (step 208); automatically associating one or more user inputs 130A-130E of the first plurality of user inputs 130 with a first control setting state 172 when the first wearable audio device 103 receives the first indication 169 (not shown) from the first peripheral device 106 (step 210); receiving, via the first communication module 112, a second indication 178 that the first peripheral device 106 is running a second application 175 (step 212); and, automatically associating one or more user inputs 130A-130E of the first plurality of user inputs 130 with a second control setting state 181 when the first wearable audio device 103 receives the second indication 178 from the first peripheral device 106 (step 214).

Optionally, as shown in FIG. 5B all of the user inputs 130A-130E of the first plurality of user inputs 130 are automatically associated with the first control setting state 172 when the first wearable audio device 103 receives the first indication 169 from the first peripheral device 106 (step 216), i.e., a full takeover. Furthermore, all of the user inputs 130A-130E of the first plurality of user inputs 130 can be automatically associated with the second control setting state 181 when the first wearable audio device 103 receives the second indication 178 from the first peripheral device 106 (step 218), i.e., a full takeover. Additionally, method 200 can further include receiving a notification 184 associated with an exit condition from the first peripheral device 106 (step 220); and automatically reverting the association of the one or more user inputs 130A-130E of the first plurality of user inputs 130 to an association with the default control setting state 163 upon receiving the notification 184 (step 222).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for establishing user controls, the method comprising:
   providing a first wearable audio device having a speaker, a first communication module, and a first user interface adapted to receive a first plurality of user inputs;
   associating the first plurality of user inputs with a default control setting state of the first wearable audio device;
   establishing, via circuitry of a first peripheral device, a first connection between the first wearable audio device and the first peripheral device;
   receiving, via the first communication module, a first indication that the first peripheral device is running a first application; and,
   automatically associating one or more user inputs of the first plurality of user inputs with a first control setting state when the first wearable audio device receives the first indication from the first peripheral device.

2. The method of claim 1, wherein all of the user inputs of the first plurality of user inputs are automatically associated with the first control setting state when the first wearable audio device receives the first indication from the first peripheral device.

3. The method of claim 1, wherein the circuitry of the first peripheral device comprises a first processor, a first memory, and second communication module.

4. The method of claim 3, wherein the second communication module comprises a first antenna arranged to wirelessly send and/or receive data exchanged in the first connection.

5. The method of claim 1, further comprising
   receiving a notification associated with an exit condition from the first peripheral device; and,
   automatically reverting the association of the one or more user inputs of the plurality of user inputs to an association with the default control setting state upon receiving the notification.

6. The method of claim 5 wherein the notification is selected from an operating system notification and/or a notification from a third-party application.

7. A method for establishing user controls, the method comprising:
   providing a first wearable audio device having a speaker, a first communication module, and a first user interface adapted to receive a first plurality of user inputs;
   associating the first plurality of user inputs with a default control setting state of the first wearable audio device;
   establishing, via circuitry of a first peripheral device, a first connection between the first wearable audio device and the first peripheral device;
   receiving, via the first communication module, a first indication that the first peripheral device is running a first application;
   automatically associating one or more user inputs of the first plurality of user inputs with a first control setting state when the first wearable audio device receives the first indication from the first peripheral device;
   receiving, via the first communication module, a second indication that the first peripheral device is running a second application; and,
   automatically associating one or more user inputs of the first plurality of user inputs with a second control setting state when the first wearable audio device receives the second indication from the first peripheral device.

8. The method of claim 7, wherein all of the user inputs of the first plurality of user inputs are automatically associated with the first control setting state when the first wearable audio device receives the first indication from the first peripheral device.

9. The method of claim 7, wherein all of the user inputs of the first plurality of user inputs are automatically associated with the second control setting state when the first wearable audio device receives the second indication from the first peripheral device.

10. The method of claim 7, wherein the circuitry of the first peripheral device comprises a first processor, a first memory, and second communication module.

11. The method of claim 10, wherein the second communication module comprises a first antenna arranged to wirelessly send and/or receive data exchanged in the first connection.

12. The method of claim 7, further comprising
    receiving a notification associated with an exit condition from the first peripheral device; and,
    automatically reverting the association of the one or more user inputs of the first plurality of user inputs to an association with the default control setting state upon receiving the notification.

13. The method of claim 12, wherein the notification is selected from an operating system notification and/or a notification from a third-party application.

14. An audio system comprising:
    a first wearable audio device comprising:
      a speaker;
      a first communication module arranged to establish a first connection with a first peripheral device and receive a first indication that a first peripheral device is running a first application; and, a first user interface adapted to receiving a first plurality of user inputs;

wherein the first peripheral device or the first wearable audio device are arranged to: (i) associate one or more user inputs of the first plurality of user inputs with a default control setting state of the first wearable audio device; and (ii) automatically associate one or more user inputs of the first plurality of user inputs with a first control setting state when the first wearable audio device receives the first indication from the first peripheral device.

15. The system of claim 14, wherein all of the user inputs of the first plurality of user inputs are automatically associated with the first control setting state when the first wearable audio device receives the first indication from the first peripheral device.

16. The system of claim 14 wherein the first communication module is arranged to receive a second indication that the first peripheral device is running a second application.

17. The system of claim 16, wherein the first peripheral device or the first wearable audio device are further arranged to: (iii) automatically associate one or more user inputs of the first plurality of user inputs with a second control setting state when the first wearable audio device receives the second indication from the first peripheral device.

18. The system of claim 17, wherein all of the user inputs of the first plurality of user inputs are automatically associated with the second control setting state when the first wearable audio device receives the second indication from the first peripheral device.

19. The system of claim 14, wherein the circuitry of the first peripheral device comprises a first processor, a first memory, and second communication module.

20. The system of claim 14, wherein the second communication module comprises a first antenna arranged to wirelessly send and/or receive data exchanged in the first connection.

21. The system of claim 14, wherein the first peripheral device or the first wearable audio device are further arranged to:

(iv) receive a notification associated with an exit condition from the first peripheral device; and, (v) automatically revert the association of the one or more user inputs of the first plurality of user inputs to an association with the default control setting state upon receiving the notification.

22. The system of claim 14, wherein the notification is selected from an operating system notification and/or a notification from a third-party application.

* * * * *